(12) United States Patent
Mahasoom et al.

(10) Patent No.: US 7,477,606 B2
(45) Date of Patent: Jan. 13, 2009

(54) SYSTEM AND METHOD FOR PATH FAILURE RECOVERY IN A COMMUNICATIONS ENVIRONMENT

(75) Inventors: Rishad Mahasoom, Dallas, TX (US); Stephen Noel, Carrollton, TX (US); Daniel Warren, Wokingham (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 806 days.

(21) Appl. No.: 10/878,274

(22) Filed: Jun. 28, 2004

(65) Prior Publication Data

US 2005/0018599 A1    Jan. 27, 2005

Related U.S. Application Data

(60) Provisional application No. 60/489,560, filed on Jul. 23, 2003.

(51) Int. Cl.
*G01R 31/08* (2006.01)
(52) U.S. Cl. .................................... 370/237; 370/395.2
(58) Field of Classification Search ................. 370/338, 370/395.4, 497, 522; 709/226, 228
See application file for complete search history.

(56) References Cited

U.S. PATENT DOCUMENTS

2003/0117983 A1    6/2003  Ton et al.
2003/0177396 A1*   9/2003  Bartlett et al. .............. 713/201

OTHER PUBLICATIONS

ETSI: "Universal Mobile Telecommunications System (UMTS). General Packet Radio Service (GPRS). GPRS Tunneling Protocol (GTP_across the Gn and Gp Interface. (3G S 29.060 version 3.3.0 Release 1999" Jan. 2000, pp. 1-78.
"Digital Cellular Telecommunications System (Phase 2+); Universal Mobile Telecommunications System (UMTS); Restoration Procedures (3GPP TS 23.007 version 5.0.0 Release 5); ETSI TS 123 007" ETSI Standards, European Telecommunications Standards Institute, Sophia-Antipo, France, vol. 3-CN2; 3-CN4, No. V500, Jun. 2002.
Warren, D. "Re: path failure" 3GPP TSG CN WG4 Archives, ' Online!, Jul. 4, 2003, pp. 1-2 URL: http://list.3gpp.org/scripts/wa.exe?A2=ind0307&L=3gpp_tsg_cn_wg4&T=0&F=&S=&P=1538>.

* cited by examiner

*Primary Examiner*—Seema S Rao
*Assistant Examiner*—Wanda Z Russell
(74) *Attorney, Agent, or Firm*—Haynes and Boone, LLP

(57) ABSTRACT

Provided are a system and method for recovering from failure of a path connecting first and second nodes in a communications network. In one example, the method includes identifying that the path has failed. Contexts affected by the path failure are deleted on the first node, and the second node with which the path was shared is notified that the contexts have been deleted.

11 Claims, 5 Drawing Sheets

SYSTEM AND METHOD FOR PATH FAILURE RECOVERY IN A COMMUNICATIONS ENVIRONMENT

CROSS-REFERENCE

This application claims priority from U.S. Provisional Patent Application Ser. No. 60/489,560, filed on Jul. 23, 2003, which is hereby incorporated by reference in its entirety.

BACKGROUND

Telecommunications systems are designed using various communication nodes (e.g., devices) that are connected via wireless or wired communication paths. The establishment of a voice or data communication path between the devices may require the creation of a call context, during which authentication and other call setup procedures may be used. Each device may support hundreds or thousands of simultaneous contexts with other devices.

Failure may occur when one (or both) of the devices fails or when the path between the devices fails. Such failure may result in dangling contexts, where contexts on one of the devices have no corresponding context on the other device. For example, failure of one of the devices may result in a restart of the device that deletes all existing contexts on that device. However, the other device may be unaware of this failure, and may continue to maintain the unpaired contexts. Current solutions to such problems fail to address the failure of the path.

Accordingly, what is needed is an improved system and method for detecting and deleting dangling contexts.

SUMMARY

In one embodiment, a method for recovering from failure of a path connecting first and second nodes in a communications network is provided. The method comprises identifying that the path has failed, deleting contexts affected by the path failure on the first node, and notifying the second node with which the path was shared that the contexts have been deleted on the first node.

Other aspects and features of the present disclosure will become apparent to those ordinarily skilled in the art upon review of the following description of specific embodiments of the disclosure in conjunction with the accompanying figures.

DETAILED DESCRIPTION

Figure 1:
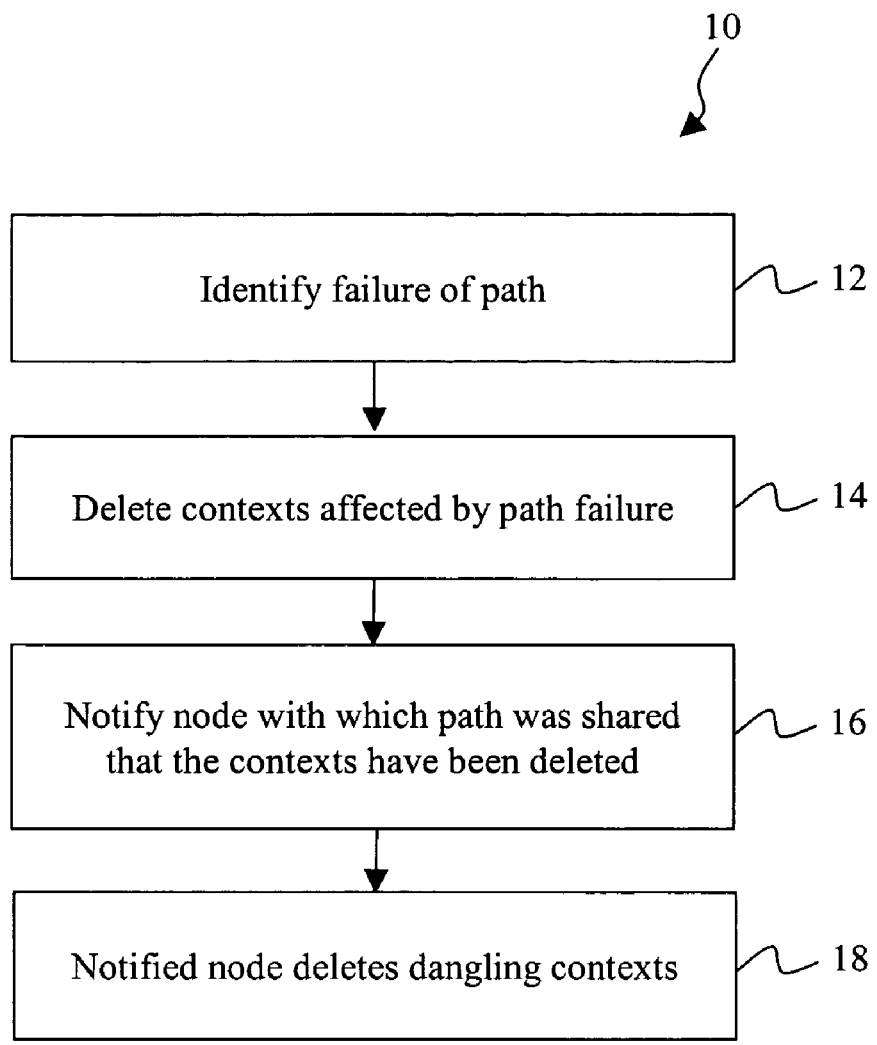
FIG. 1 is a flowchart of an exemplary method for deleting dangling contexts after failure of a communication path.

The present disclosure relates generally to communications systems and, more particularly, to path failure recovery in such systems. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 may be used to recover from path failure in a communications environment. As will be described later in greater detail, the path connects first and second (or more) telecommunications nodes (e.g., devices) in a network. The failure of the path may affect contexts that exist to support voice or data calls between the first and second nodes. For example, the first node may notice that the path is down and may delete the contexts that the first node was maintaining with the second node. This may result in dangling contexts on the second node, as the second node continues to support the contexts that have been deleted on the first node.

Accordingly, in step 12 of the method 10, the first node identifies that the path has failed. The identification may involve the first node detecting the failure or being notified of the failure by another node. In step 14, the first node deletes the contexts affected by the path failure (e.g., the contexts maintained with the second node). In step 16, the first node notifies the second node (with which the path was shared) that the contexts have been deleted. This enables the second node to know that it can safely delete the dangling contexts and, in step 18, the second node may do so. Accordingly, the method 10 enables the nodes to recover from the failure of the path by deleting any contexts affected by the path failure on both nodes.

Figure 2:
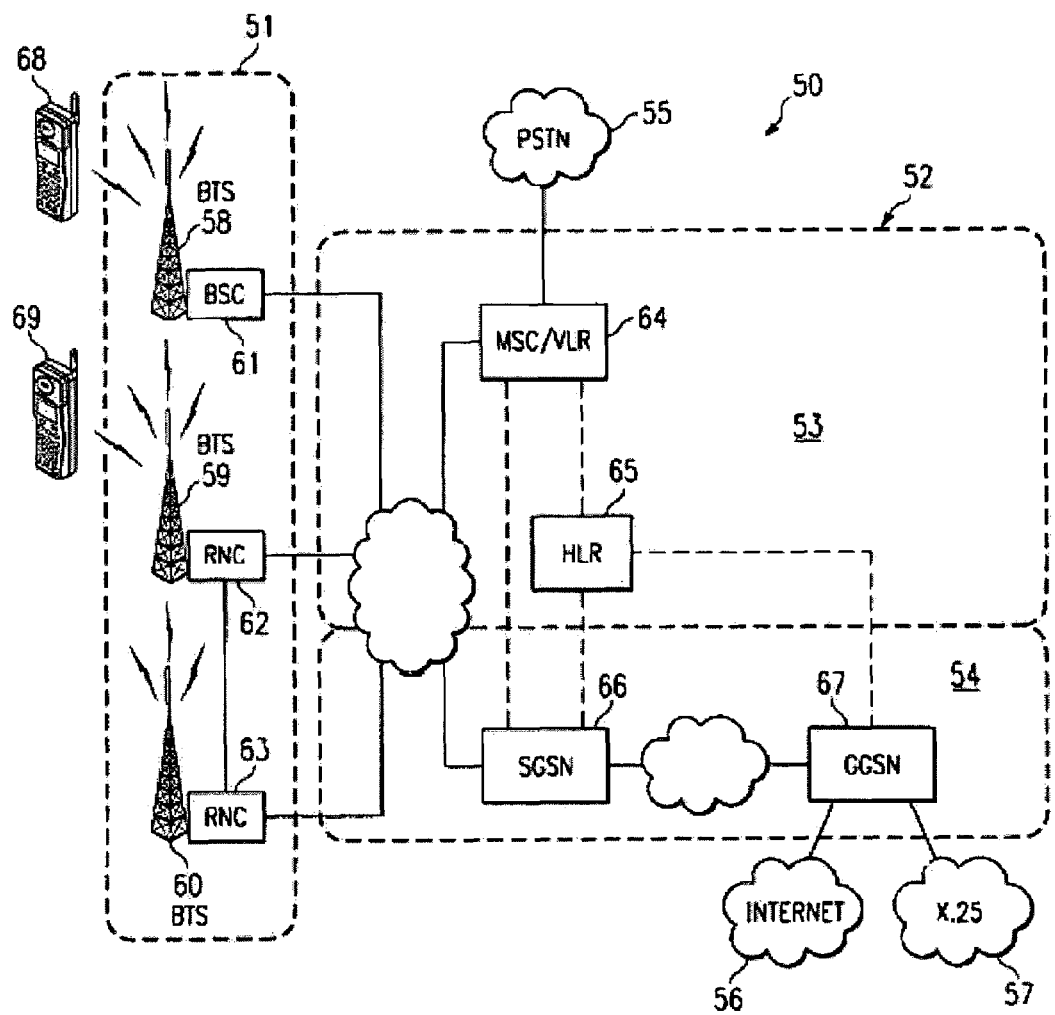
FIG. 2 is a diagram of an exemplary telecommunications network within which context deletion may be practiced.

Referring now to FIG. 2, a telecommunications network 50 illustrates an exemplary system in which the method 10 described in reference to FIG. 1 may be practiced. In the present example, the network 50 is a wireless network that supports both voice and data packet communications using General Packet Service Radio (GPRS) and Universal Mobile Telecommunications System (UMTS) technologies.

The network 50 comprises a Radio Access Network (RAN) 51 and a core network 52. The core network further comprises a circuit domain 53 and a packet domain 54. Other networks may be accessible to the network 50, such as a Public Switch Telephone Network (PSTN) 55 (connected to the circuit domain 53), Internet 56, and an X.25 network 57 (both connected to the packet domain 54).

The RAN 51 includes a plurality of cells (not shown) serviced by base transceiver stations (BTS) 58, 59, and 60. The BTS 58 is connected to a base station controller (BSC) 61 to provide a second-generation wireless network. The BTSs 59, 60 are accessible to radio network controllers (RNC) 62, 63, respectively, to provide a third-generation wireless network. A mobile switching center/visitor location register (MSC/VLR) 64 may be used to connect the core network 53 with other networks, such as the PSTN 55. A home location register (HLR) 65 may be accessible to the MSC/VLR 64 and also to a serving GPRS support node (SGSN) 66 and a gateway GPRS support node (GGSN) 67 in the packet domain 54.

The network 50 enables at least one mobile device 68 to establish a communication session with another device via the BTS 58. For example, a request to establish a communication session by the mobile device 68 may be directed by the MSC/VLR 64 to (1) a second mobile device 69, (2) a voice terminal (not shown) coupled to the PSTN 55, or (3) a data terminal (not shown) coupled elsewhere to the telecommunications network 50. For example, if the communication session is a circuit data transfer session, the request may be to connect the mobile device 68 to a computer or other data device via the network 50. If the communication is a packet data transfer session, the request may be routed through the SGSN 66, the GGSN 67, and to the Internet 56. It is noted that the mobile devices 68 and 69, while illustrated as mobile telephones, may be any mobile device capable of communicating via the network 50. It is understood that the network 50 is for purposes of illustration and the present disclosure may be equally applicable to other networks, including code division multiple access (CDMA) and time division multiple access (TDMA) networks.

Figure 3:
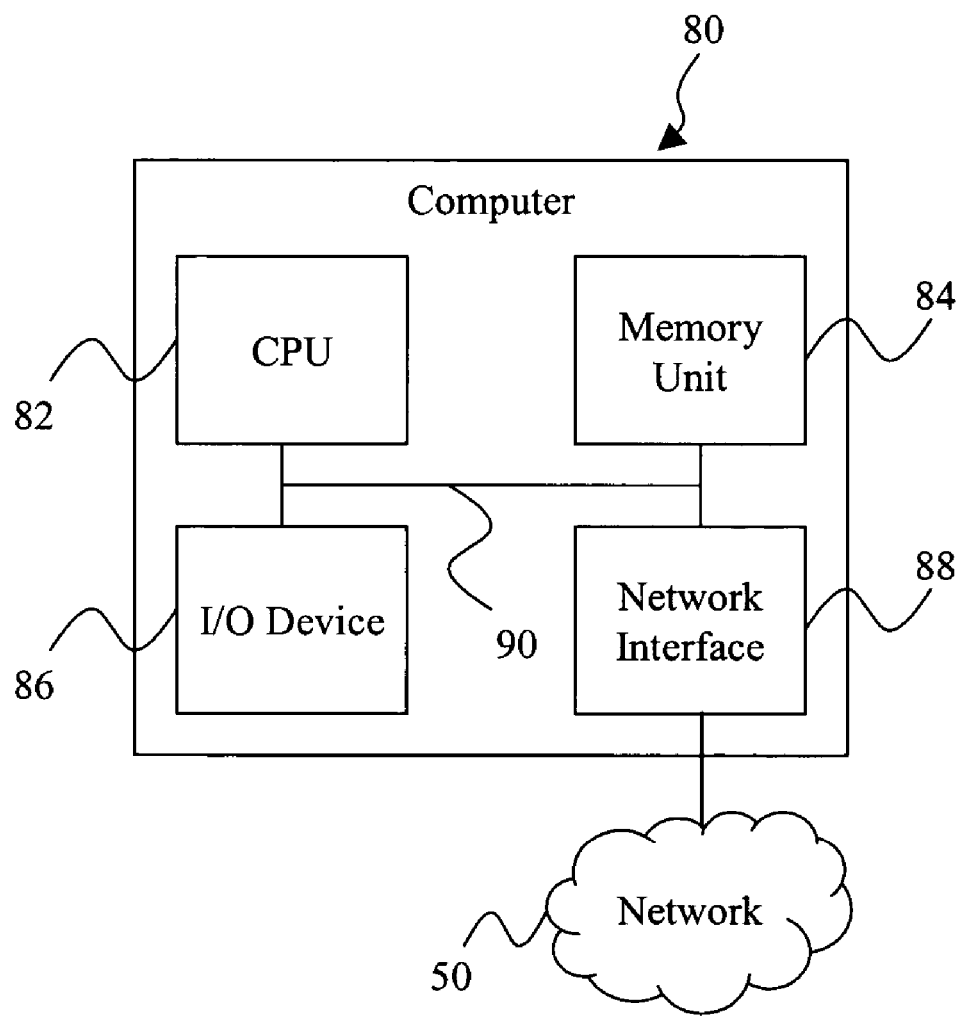
FIG. 3 is a schematic view of a computer that may be used within the network of FIG. 2 to execute the method of FIG. 1.

Referring now to FIG. 3, an exemplary computer 80, such as may be used in the network 50 of FIG. 2, is illustrated. The computer 80 may include a central processing unit ("CPU") 82, a memory unit 84, an input/output ("I/O") device 86, and a network interface 88. The components 82, 84, 86, and 88 are interconnected by a bus system 90. It is understood that the computer may be differently configured and that each of the listed components may actually represent several different components. For example, the CPU 82 may actually represent a multi-processor or a distributed processing system; the memory unit 84 may include different levels of cache memory, main memory, hard disks, and remote storage locations; and the I/O device 86 may include monitors, keyboards, and the like.

The computer 80 may be connected to the network 50 via the network interface 88. Because the computer 80 may be connected to the network 50, certain components may, at times, be shared with other computers (not shown). Therefore, a wide range of flexibility is anticipated in the configuration of the computer. Furthermore, it is understood that, in some implementations, the computer 80 may act as a server to other computers. Accordingly, the method 10 of FIG. 1 may be stored and executed solely on the computer 80 or may be divided among multiple computers and accessible via the network 50. In addition, the network 50 may serve as all or part of the bus system 90 and so the various components 82-88 may be distributed through the network 50.

Figure 4:
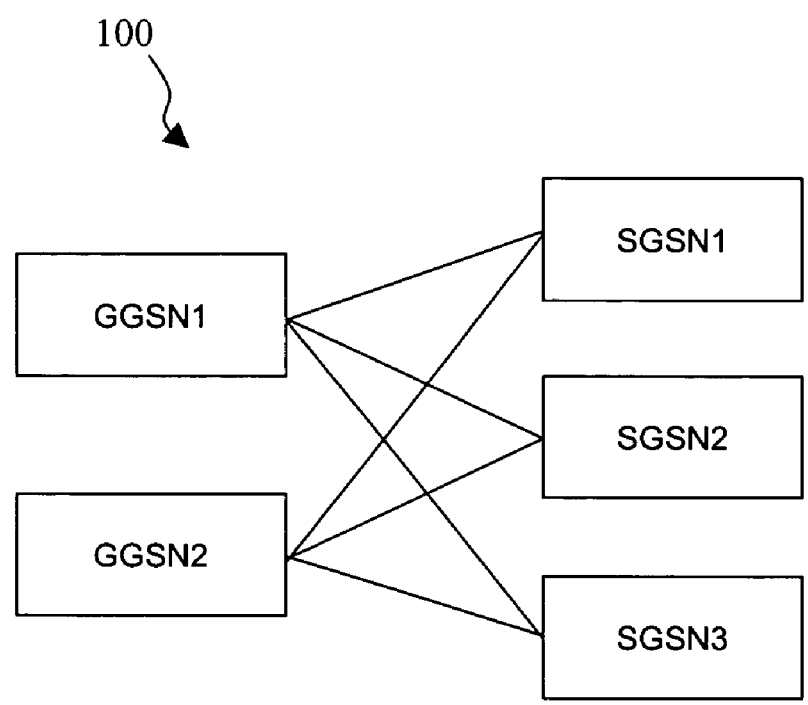
FIG. 4 is a diagram of multiple communications nodes within the network of FIG. 2 within which the context deletion method of FIG. 1 may be practiced.

Referring now to FIG. 4, five exemplary nodes are illustrated in a system 100. In the present example, the nodes are GPRS support nodes (GSNs) that include two GGSNs GGSN1, GGSN2, (which may be similar to the GGSN 67 of FIG. 2) and three SGSNs SGSN1, SGSN2, and SGSN3 (which may be similar to the SGSN 66 of FIG. 2). As illustrated, each of the GGSNs is connected to each of the SGSNs via a wired or wireless communication path. The connected GGSNs and SGSNs may include support for contexts, such as packet data protocol (PDP) contexts, to maintain communication channels between the GSNs. In addition, the GSNs may communicate via a protocol such as the GPRS tunneling protocol (GTP).

Each of the GGSNs and SGSNs includes one or more indicators, such as a recovery information element (IE) (e.g., a value in a restart counter), associated with each node and/or path. More specifically, in the present example, GGSN1, SGSN1, and SGSN2 each include a restart counter that is associated with another node and the connecting path. Each of the GSNs GGSN1, SGSN1, and SGSN2 stores its own local restart value associated with each connected GSN in non-volatile memory and stores the restart value it has received from each connected GSN in volatile memory. The values stored in the non-volatile memory of GGSN1, SGSN1, and SGSN2 are incremented individually if contact is lost with the respective node, and all of the values are incremented if the node itself goes down. GGSN2 and SGSN3 only support a restart counter associated with a node, and store only a single value in their non-volatile memory (e.g., their local restart value) that is incremented only when the node goes down. It is understood that GGSN2 and SGSN3 may represent GSNs that are unable to recover from path failure by themselves, as their restart counters are not associated with the paths. In some embodiments, the indicators may also be used to track whether a GSN has restarted. In addition, it is understood that an indicator may be updated upon path failure and/or restart, as well as upon node failure and/or restart.

For purposes of illustration, as shown below in Table 1, GGSN1 has three pairs of restart counters, with one pair being associated with the node/path of SGSN1 (values 'a' and 'x'), another pair with the node/path of SGSN2 (values 'b' and 'y'), and the last pair with the node/path of SGSN3 (values 'c' and 'z'). For example, value 'a' is the local restart value for GGSN1 and value 'x' is the restart value that GGSN1 has received from SGSN1.

TABLE 1

(original restart counter values for GGSN1)

|  | Non-volatile | Volatile |
|---|---|---|
| SGSN1 | a | x |
| SGSN2 | b | y |
| SGSN3 | c | z |

As shown below in Table 2, GGSN2 has three pairs of restart counters, with one pair being associated with the node SGSN1 (values 'd' and 'p'), another pair with the node SGSN2 (values 'd' and 'q'), and the last pair with the node SGSN3 (values 'd' and 'z'). It is noted that the value 'd' repeats because GGSN2 only supports a restart counter associated with a node, and stores a single value in non-volatile memory that is incremented only when the node goes down.

TABLE 2

(original restart counter values for GGSN2)

|  | Non-volatile | Volatile |
|---|---|---|
| SGSN1 | d | p |
| SGSN2 | d | q |
| SGSN3 | d | z |

As shown below in Table 3, SGSN1 has two pairs of restart counters, with one pair being associated with the node/path GGSN1 (values 'x' and 'a'), and another pair with the node/path GGSN2 (values 'p' and 'd').

TABLE 3

(original restart counter values for SGSN1)

|  | Non-volatile | Volatile |
|---|---|---|
| GGSN1 | x | a |
| GGSN2 | p | d |

As shown below in Table 4, SGSN2 has two pairs of restart counters, with one pair being associated with the node/path GGSN1 (values 'y' and 'b'), and another pair with the node/path GGSN2 (values 'q' and 'd').

TABLE 4

(original restart counter values for SGSN2)

|  | Non-volatile | Volatile |
|---|---|---|
| GGSN1 | y | b |
| GGSN2 | q | d |

As shown below in Table 5, SGSN3 has two pairs of restart counters, with one pair being associated with the node GGSN1 (values 'd' and 'c'), and another pair with the node GGSN2 (values 'z' and 'd'). It is noted that the value 'z' repeats because SGSN3 only supports a restart counter associated with a node, and stores a single value in non-volatile memory that is incremented only when the node goes down.

TABLE 5

(original restart counter values for SGSN3)

|  | Non-volatile | Volatile |
|---|---|---|
| GGSN1 | z | c |
| GGSN2 | z | d |

Figure 5:
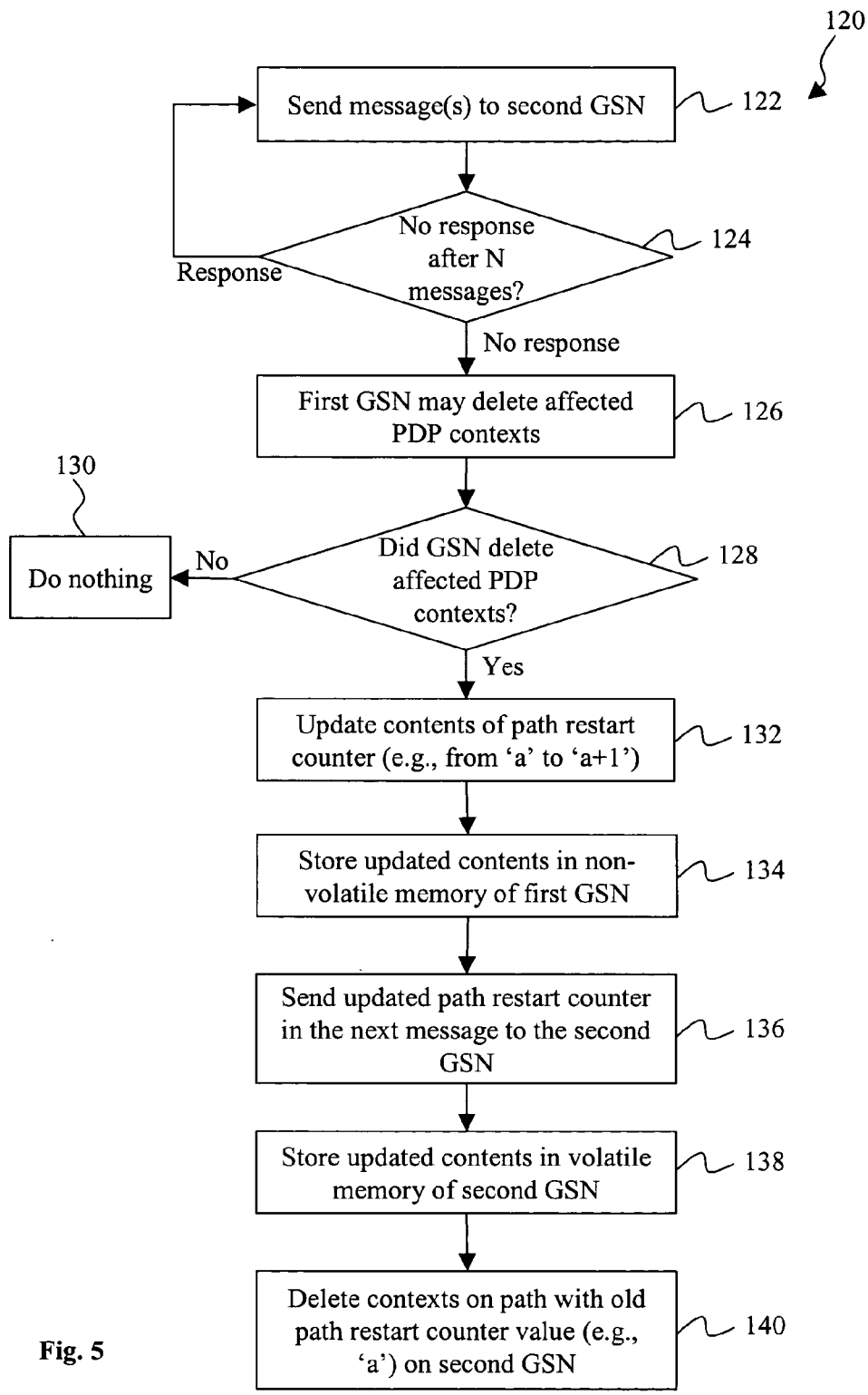
FIG. 5 is a flowchart of an exemplary method for deleting dangling contexts on one or more of the nodes of FIG. 4.

With additional reference to FIG. 5, an exemplary method 120 illustrates the deletion of dangling contexts between, for example, two of the GSNs of FIG. 4. For purposes of illustration, the method is described using a link failure between GGSN1 and SGSN1 from the point of view of GGSN1.

It is noted that, in the following description, the term "noticed" may be used. In the present example, "noticed" means that the GSN has attempted a predefined number of attempts (e.g., 3) to contact another GSN without receiving a reply and has determined that the receiving GSN is unreachable. For example, the GSN may send a number of GTP-C messages and wait for a reply for each one. If a predefined number of sequential messages are not answered, it is assumed that the link has failed or the node receiving the messages is down. Accordingly, terms such as "not noticed" mean that, although the link between two GSNs may be down or the receiving GSN may be out of commission, the GSN that would have been sending the GTP-C messages to the receiving GSN has not sent any GTP-C messages in the period that the failure has occurred and is unaware of the link/node failure.

In steps 122 and 124, GGSN1 may determine if the link to SGSN1 is down by sending messages to SGSN1 and determining whether SGSN1 is responding. It is understood that other processes may be used to determine whether the link and/or node is down. After a predefined number of failed messages, the method 120 moves to step 126, where it may delete the affected contexts on the assumption that the link is down. It is noted that other contexts may remain between GGSN1 and SGSN2 and between GGSN1 and SGSN3. In step 128, a determination may be made as to whether GGSN1 deleted the affected contexts in step 126. If the contexts were not deleted, the method continues to step 130 and no further action is taken. If the contexts were deleted, the method continues to step 132.

In step 132, when GGSN1 notices that the link/node is down and deletes the affected contexts, the path restart counter is updated from 'a' to 'a+1' for the path to SGSN1 and the updated contents are stored in non-volatile memory in step 134 (see Table 6, below).

TABLE 6

(updated restart counter values for GGSN1)

|  | Non-volatile | Volatile |
|---|---|---|
| SGSN1 | a + 1 | x |
| SGSN2 | b | y |
| SGSN3 | c | z |

In step 136, GGSN1 sends the updated path restart counter to SGSN1 in the next available GTP-C message, and SGSN1 stores the updated value in volatile memory in step 138 (see Table 7, below).

TABLE 7

(updated restart counter values for SGSN1)

|  | Non-volatile | Volatile |
|---|---|---|
| GGSN1 | x | a + 1 |
| GGSN2 | p | d |

Accordingly, GGSN1 and SGSN1 may be synchronized (from the standpoint of shared contexts) and may have no dangling contexts relating to the other node.

If SGSN1 has not noticed that the link is down, in step 140, it will delete the contexts associated with the link upon receipt of the updated value of the restart counter. If GGSN1 has not deleted the contexts (and not updated the restart counter), SGSN1 will not update its value for the restart counter related to the link in non-volatile memory.

It is noted that a link failure between GGSN1 and SGSN1 described from the point of view of SGSN1 may be similar. For example, if SGSN1 has noticed that the link is down, it may delete the contexts affected. After deleting the affected contexts, SGSN1 may update the restart counter from 'x' to 'x+1' for the path to GGSN1 and store the updated contents in its non-volatile memory. SGSN1 may then send the updated restart value to GGSN1 in the next available GTP-C message, and GGSN1 may store the updated value in its volatile memory. If GGSN1 has not noticed that the link is down, upon receipt of the updated value of the restart counter, it may delete the contexts on that link. If SGSN1 has not deleted the contexts, it does not update its value for the restart counter related to that link in non-volatile memory. If neither GGSN1 nor SGSN1 has noticed that the link between them is down, no updates take place.

The following embodiments describe exemplary scenarios between various GSNs of FIG. 4. It is understood that the method 120 of FIG. 5 may be used in one or more of the embodiments as previously described, but is not explicitly incorporated into each scenario.

Referring again to FIG. 4, in still another embodiment, a link failure between GGSN1 and SGSN3 is described. If GGSN1 has noticed that the link is down, it may delete the contexts affected. If the contexts are deleted, GGSN1 updates the restart counter from 'c' to 'c+1' (see Table 1, above) for the path to SGSN3 and stores the updated value in non-volatile memory. GGSN1 then sends the updated restart value to SGSN3 in the next available GTP-C message, and SGSN3 stores the updated value in volatile memory. If SGSN3 has not noticed that the link is down, upon receipt of the updated value of the restart counter, it may delete the contexts associated with that link. If GGSN1 has not deleted the contexts, it does not update its value for the restart counter related to that link in non-volatile memory.

If SGSN3 has noticed that the link is down, it may delete the contexts affected. However, as previously described, SGSN3 does not have a restart counter associated with each path. Accordingly, SGSN3 does not update 'z' and is unable to inform GGSN1 that the contexts associated with the link have been deleted. In this example, if GGSN1 has not noticed that the link is down and SGSN3 has deleted the associated contexts, the contexts will be left dangling on GGSN1. If neither GSN has noticed that the link between them is down, no updates take place.

With continued reference to FIG. 4, in another embodiment, a link failure between GGSN2 and SGSN1 is described. If GGSN2 has noticed that the link is down, it may delete the contexts affected. However, as previously described, GGSN2 does not have a restart counter associated with each path. Accordingly, GGSN2 does not update 'd' and is unable to inform SGSN1 that the contexts associated with the link have been deleted. In this example, if SGSN1 has not noticed that the link is down and GGSN1 has deleted the associated contexts, the contexts may be left dangling on SGSN1.

If SGSN1 has noticed that the link is down, it may delete the contexts affected. If the contexts are deleted, it updates the restart counter from 'p' to 'p+1' (see Table 3 above) for the path to GGSN2 and stores the updated value in non-volatile memory. SGSN1 then sends the updated restart value to GGSN2 in the next available GTP-C message, and GGSN2 stores the updated value in volatile memory. If GGSN2 has not noticed that the link is down, upon receipt of the updated value of the restart counter, it deletes the contexts on that link. If SGSN1 has not deleted the contexts, SGSN1 does not update its value for the restart counter related to that link in non-volatile memory. If neither GSN has noticed that the link between them is down, no updates take place.

With continued reference to FIG. 4, in yet another embodiment, GGSN1 fails. When GGSN1 comes back online (e.g., restarts), it updates and sends a recovery IE in the next available GTP-C message with a restart value of 'a+1' to SGSN1, 'b+1' to SGSN2 and 'c+1' to SGSN3 (see Table 1 above). Upon receipt of the updated recovery IE values, the SGSNs delete contexts that were active on the links to GGSN1 if they have not done so already.

If SGSN1 and SGSN2 have noticed that there is no response from GGSN1, they may delete the contexts affected. It is noted that they may not know at the GTP-C layer whether GGSN1 is down or whether the link between themselves and GGSN1 is down. If they delete the contexts, they send update the restart counters to 'x+1' (SGSN1) and 'y+1' (SGSN2) (see Tables 3 and 4 above) and send the updated values to GGSN1 in the next available GTP-C messages. It is noted that GGSN1 may already have "deleted" the contexts (e.g., the contexts may have been lost as a result of the restart).

If SGSN3 has noticed that there is no response from GGSN1, it may delete the contexts affected. However, as previously described, SGSN1 does not have a restart counter associated with the path, and does not increment the restart value stored in its non-volatile memory. Accordingly, SGSN1 takes no action with respect to informing GGSN1.

If SGSN1, SGSN2, and/or SGSN3 have not noticed that GGSN1 is down, the contexts may not be deleted until each SGSN receives the incremented restart values from GGSN1 when GGSN1 comes back up.

With continued reference to FIG. 4, in yet another embodiment, SGSN1 fails. When SGSN1 restarts, it updates its restart counters and sends a recovery IE using GTP-C messages with a restart value of 'x+1' to GGSN1 and 'p+1' to GGSN2 (see Table 3 above). Upon receipt of the updated recovery IE values, the GGSNs delete the contexts that were active with SGSN1 if they have not done so already.

If GGSN1 has noticed that there is no response from SGSN1, it may delete the contexts affected and update the restart value stored in non-volatile memory (Table 1). If it deletes the contexts, it sends the restart value 'a+1' in the next available GTP-C message. However, the contexts on SGSN1 may have already been lost as a result of the restart.

If GGSN2 has noticed that there is no response from SGSN1, it may delete the contexts affected. However, as previously described, GGSN2 does not have a restart counter associated with the path, and does not increment the restart value stored in its non-volatile memory.

If GGSN1 and/or GGSN2 have not noticed that SGSN1 is down, the contexts may not be deleted until each GGSN receives the incremented restart values from SGSN1 when SGSN1 restarts.

With continued reference to FIG. 4, in yet another embodiment, GGSN2 fails. When GGSN2 restarts, it updates its restart counters and sends a recovery IE in the next available GTP-C message with a restart value of 'd+1' to SGSN1, SGSN2, and SGSN3 (see Table 2 above). Upon receipt of the updated recovery IE values, the SGSNs delete contexts that were active on the links to GGSN2 if they have not done so already.

If SGSN1 and SGSN2 have noticed that there is no response from GGSN2, they may delete the contexts affected. If they delete the contexts, they update their restart counters and send the updated values of 'p+1' (SGSN1) and 'q+1' (SGSN2) (see Tables 3 and 4 above) in the next available GTP-C message. However, the contexts on GGSN2 may have already been lost as a result of the restart.

If SGSN3 has noticed that there is no response from GGSN2, it may delete the contexts affected. However, as previously described, SGSN3 does not have a restart counter associated with the path, and does not increment the restart value stored in its non-volatile memory.

If SGSN1, SGSN2, and/or SGSN3 have not noticed that GGSN2 is down, the contexts may not be deleted until each SGSN receives the incremented restart values from GGSN2 when GGSN2 restarts.

With continued reference to FIG. 4, in another embodiment, SGSN3 fails. When SGSN3 comes back up, it updates its recovery counter and sends a recovery IE in the next available GTP-C message with a restart value of 'z+1' to GGSN1 and GGSN2 (see Table 5 above). Upon receipt of the updated recovery IE value, the GGSNs delete contexts that were active with SGSN3 if they have not done so already.

If GGSN1 has noticed that there is no response from SGSN3, it may delete the contexts affected. If it deletes the contexts, it updates its restart counter and sends a restart value of 'c+1' (see Table 1 above) in the next available GTP-C message. However, the contexts on SGSN3 may have already been lost as a result of the restart.

If GGSN2 has noticed that there is no response from SGSN3, it may delete the contexts affected. However, as previously described, GGSN2 does not have a restart counter associated with the path, and does not increment the restart value stored in its non-volatile memory.

If GGSN1 and/GGSN2 have not noticed that SGSN3 is down, the contexts may not be deleted until each GGSN receives the incremented restart values from SGSN3 when SGSN3 comes back up.

It is understood that the functionality provided by the restart counters and the values stored therein may be implemented in a number of ways in different systems. Accordingly, the use of terms such as restart counters and recovery IEs are for purposes of example only, and are not intended to be limiting.

While the preceding description shows and describes one or more embodiments, it will be understood by those skilled in the art that various changes in form and detail may be made therein without departing from the spirit and scope of the present disclosure. For example, it is within the scope of the present disclosure that the BTS, the BSC, the RNC, the MSC, the SGSN, the GGSN, and/or the mobile device may not exist in the same fashion in other technologies or implementations, but the same functionality may be achieved using other components. In addition, the various steps in the described methods may be performed in a different order than that described, may be modified, and/or may be combined or further separated. Therefore, the claims should be interpreted in a broad manner, consistent with the present disclosure.

What is claimed is:

1. A communications system configured for recovering from path failure between nodes, the system comprising:
   first and second nodes connected by a link;
   a processor accessible to the first node;
   a memory accessible to the processor; and
   a plurality of instructions stored on the memory and executable by the processor, the instructions including:
   instructions for determining that the link has failed;
   instructions for deleting at least one Packet Data Protocol (PDP) context associated with the link on the first node;
   instructions for updating a value on the first node to indicate that the at least one PDP context has been deleted, wherein the value is associated with the link; and
   instructions for sending the updated value to the second node to indicate to the second node that the at least one PDP context has been deleted.

2. The system of claim 1, wherein the system includes a wireless network supporting General Packet Radio Service (GPRS) and wherein the nodes are GPRS support nodes.

3. The system of claim 1, wherein the value is a restart value in a restart counter.

4. The system of claim 3, wherein the restart value is stored in non-volatile memory in the first node.

5. The system of claim 1 further comprising instructions for execution by a processor associated with the second node, the instructions comprising:

instructions for receiving the updated value from the first node;
   instructions for storing the updated value; and
   instructions for deleting at least one shared context on the second node, wherein the at least one shared context corresponds to the at least one PDP context deleted on the first node.

6. The system of claim 5, wherein the updated value is stored in volatile memory in the second node.

7. The system of claim 5, wherein the at least one shared context is deleted on the second node only if the second node has not already identified that the path has failed and deleted the at least one shared context before receiving the updated value from the first node.

8. A method for path failure recovery, the method comprising:
   providing a gateway serving node (GSN) on each end of a data path connection;
   providing a local non-volatile recovery counter on a per path basis on each GSN;
   providing a local volatile recovery counter on a per path basis on each GSN, the local volatile recovery counter containing a recovery counter last received from the GSN on the other end of the data path in a response message;
   incrementing the local non-volatile recovery counter in response to messages transmitted from one GSN to the GSN on the other end of the data path, the local non-volatile recovery counter for indicating to the GSN on the other end of the data path that at least one Packet Data Protocol (PDP) context on the data path have been deleted by the GSN transmitting the response message;
   deleting the at least one PDP context associated with the data path in response to the recovery counter received in a response message being not equal to the local volatile recovery counter associated with the data path; and
   storing the recovery counter received in the response message in the local volatile recovery counter associated with the data path on the GSN.

9. The method of claim 8 wherein the at least one PDP context is deleted due to path failure.

10. The method of claim 8 wherein the at least one PDP context is deleted due to path restart.

11. The method of claim 8 wherein a GSN informs peer GSNs that the at least one PDP context has been deleted due to path failure.

* * * * *